United States Patent
Pomini et al.

[11] Patent Number: 5,806,974
[45] Date of Patent: Sep. 15, 1998

[54] PARALLEL-ROTOR MIXING MACHINE WITH A CLOSED MIXING CHAMBER HAVING WALLS SYMMETRICALLY TRANSLATED WITH RESPECT TO THE ROTOR AXES

[75] Inventors: Luigi Pomini; Victor Gheorghita, both of Castellanza, Italy

[73] Assignee: Pomini S.p.A., Castellanza, Italy

[21] Appl. No.: 728,953

[22] Filed: Oct. 11, 1996

[30] Foreign Application Priority Data

Oct. 27, 1995 [IT] Italy ................................ MI95A2224

[51] Int. Cl.⁶ .................................................. B29B 7/18
[52] U.S. Cl. ................................................ 366/84; 366/297
[58] Field of Search ................................ 366/73, 84, 83, 366/285, 292, 297, 300, 301, 97, 85

[56] References Cited

U.S. PATENT DOCUMENTS

| | | | |
|---|---|---|---|
| 1,390,599 | 9/1921 | Bowen | 366/73 |
| 1,777,294 | 10/1930 | Dellengarger | 366/83 |
| 2,979,799 | 4/1961 | Decker | 366/73 |
| 4,620,793 | 11/1986 | Bell | 366/84 |
| 4,775,240 | 10/1988 | Passoni | 366/301 |
| 4,871,259 | 10/1989 | Harada et al. | 366/85 |
| 5,297,935 | 3/1994 | Passoni | 366/85 |

FOREIGN PATENT DOCUMENTS

| | | | |
|---|---|---|---|
| 0 230 333 | 1/1987 | European Pat. Off. | |
| 1163217 | 2/1964 | Germany | 366/83 |
| 41 21 882 | 1/1993 | Germany | 366/73 |
| 55211 | 3/1991 | Japan | 366/73 |
| 59084 | 3/1947 | Netherlands | 366/84 |
| 595168 | 2/1978 | U.S.S.R. | 366/85 |

Primary Examiner—Tony G. Soohoo
Attorney, Agent, or Firm—Herbert Dubno; Yuri Kateshov

[57] ABSTRACT

Mixing machine for elastomers, plastomers and the like, comprising a closed mixing chamber (8) having housed inside it the rotors (4) rotating about respective parallel and horizontal axes of rotation (4a), wherein said chamber (8) has semi-cylindrical walls (6) with axes (6a) parallel to the axes (4a) of rotation of the rotors (4) and symmetrically translated with respect to the latter, said translation being effected outwards in a direction lying on the horizontal plane containing said axes of the walls (6) and the rotors (4) and perpendicular to the latter.

1 Claim, 3 Drawing Sheets

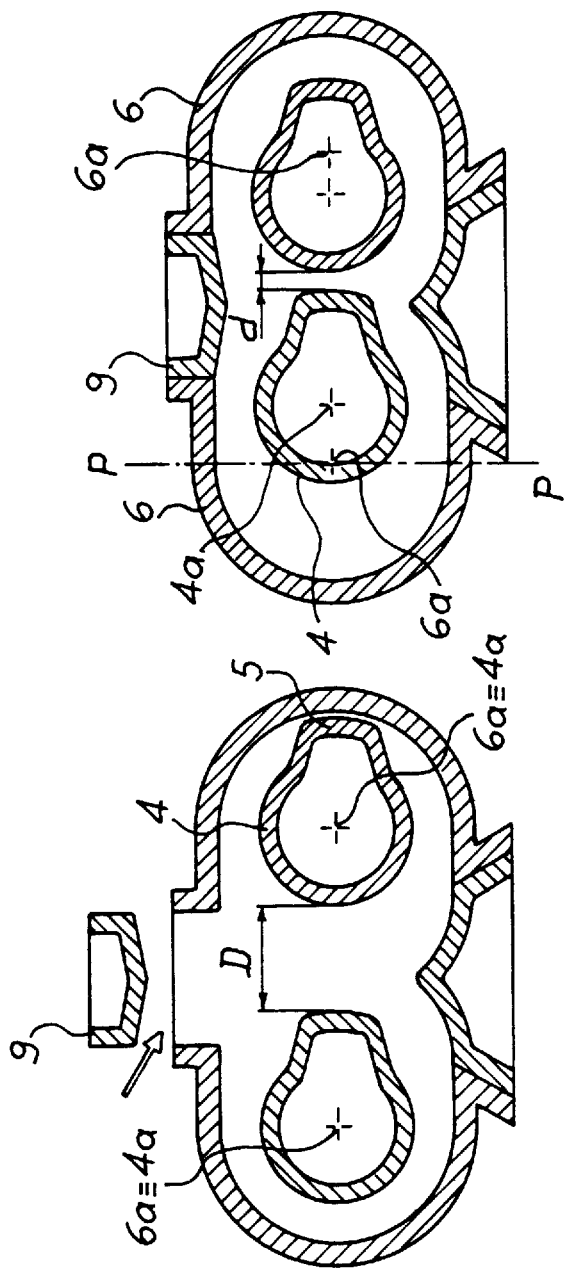

PARALLEL-ROTOR MIXING MACHINE WITH A CLOSED MIXING CHAMBER HAVING WALLS SYMMETRICALLY TRANSLATED WITH RESPECT TO THE ROTOR AXES

SPECIFICATION

1. Field of the Invention

The present invention relates to mixing machines for elastomers, plastomers and the like, comprising a closed mixing chamber having the rotors arranged inside it and defined by semi-cylindrical walls with axes parallel to the axes of rotation of the rotors and symmetrically translated outwards with respect to the latter in a direction lying on the horizontal plane containing the axes.

2. Background of the Invention

In the art relating to the mixing of elastomers, plastomers and the like it is known of machines called internal mixers which are substantially formed by a mixing chamber housing inside it two parallel-axis rotors which are supplied with the raw materials constituting the components of the mixture which one wishes to obtain.

Such rotors may be of the so-called mutually penetrating or interacting type, i.e. with trajectories of the vanes which overlap during rotation so that the mixing action is principally performed by interaction of the two rotors.

It is also known that this interaction is based on the interaxial distance between the rotors themselves, which must be adjusted according to the particular type of mixture to be homogenized.

These types of mixers with mutually penetrating rotors and variable adjustment of the interaxial distance are for example known from the patent EP 0,230,333 in the name of the same proprietor.

The mixers, however, have some drawbacks arising from the fact that the possibility of adjustment of the interaxial distance between the rotors is limited by the overall dimensions of the mixing chamber and does not allow one to obtain an interaxial distance varying substantially in relation to the various mixing phases, which may be distinguished as follows:

- an initial phase involving feeding of the mixture components, during which the maximum distance is required in order to facilitate rapid introduction of the raw materials; and
- a subsequent phase involving actual mixing, during which the rotors must be positioned at the relative working distance programmed in relation to the specific mixture to be obtained.

OBJECTS OF THE INVENTION

The primary object of the invention is to provide a mixing machine which allows adjustment of the interaxial distance between the rotors.

Another object is to provide the mixing machine which has minimal passive such as to minimize the passive time during which the components fed from a loading hopper are stationary between the rotors and obtain at the same time a greater volume available for circulation of the material.

SUMMARY OF THE INVENTION

These results are obtained by the present invention which envisages a mixing machine for elastomers, plastomers and the like, comprising a closed mixing chamber having, housed inside it, the rotors rotating about respective parallel and horizontal axes of rotation, wherein the chamber has semi-cylindrical walls with axes which are parallel to the axes of rotation of the rotors and symmetrically translated with respect to the latter, the translation being effected outwards in a direction lying on the horizontal plane containing the axes of the walls and the rotors and perpendicular to the latter.

BRIEF DESCRIPTION OF THE DRAWING

The above and other objects, features, and advantages will become more readily apparent from the following description, reference being made to the accompanying drawing in which:

Further details may be obtained from the following description, with reference to the accompanying drawings, in which:

FIG. 3a is a schematic vertical section through the mixing chamber with the rotors arranged at a distance from one another for the loading phase; and FIG. 3b is analogous to FIG. 3a but illustrates the rotors in the mixture processing phase.

SPECIFIC DESCRIPTION

Figure 1:
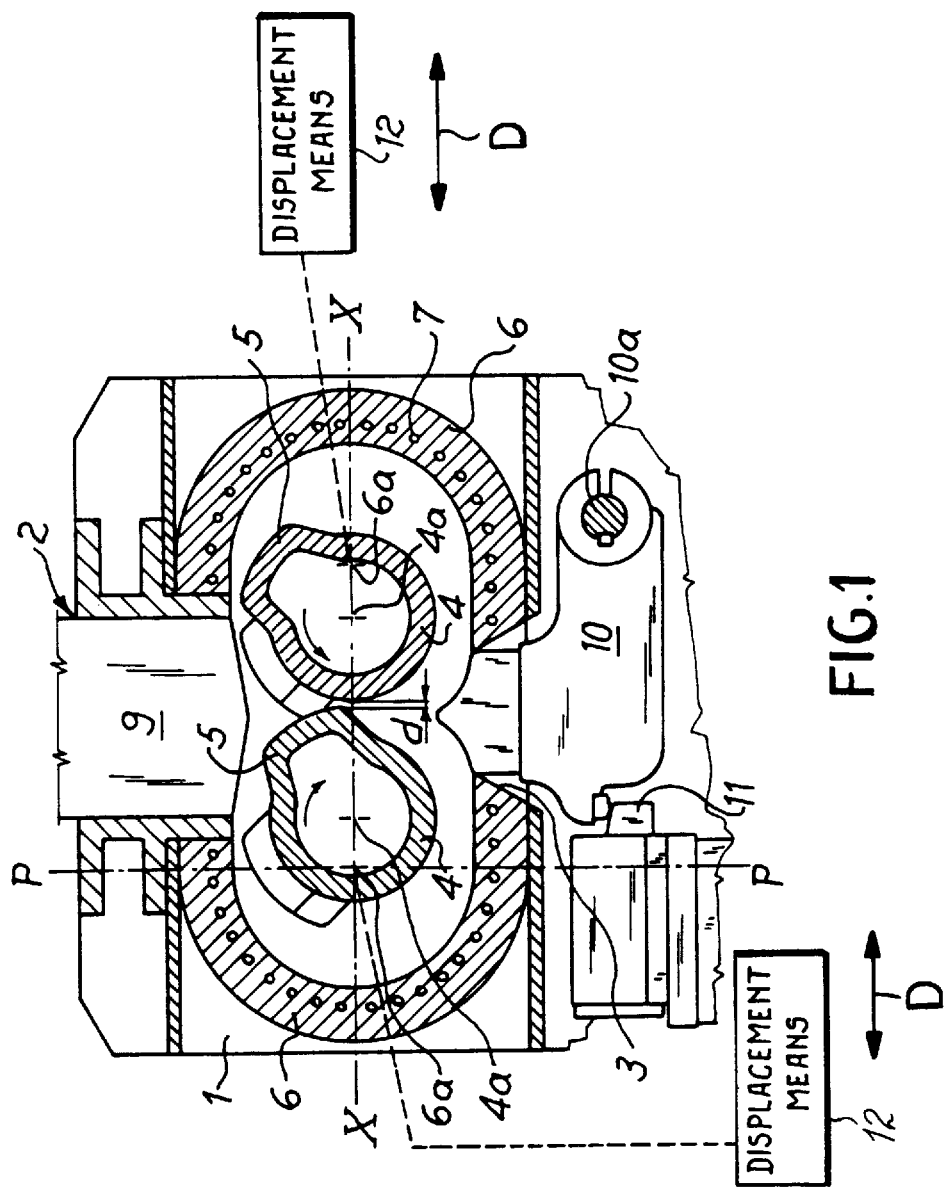
FIG. 1 is a schematic partial section along a vertical plane of an internal mixer according to the invention.
Figure 2:
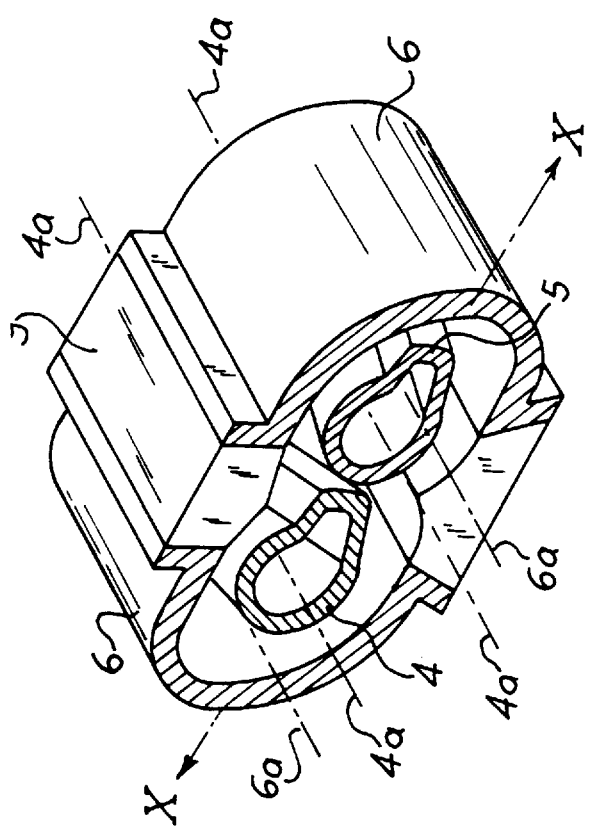
FIG. 2 is a schematic axonometric view of the mixing chamber.

As shown in FIG. 1, a mixing machine of the so-called internal type for elastomers, plastomers and the like comprises an external casing 1 provided with an upper opening 2 for the introduction of the material to be processed and a lower opening 3 for discharging the mixture obtained.

The casing 1 has formed with a mixing chamber 8 which is defined by semi-cylindrical walls 6 terminated in a vertical plane P—P which includes a wall axis 6a provided with internal cooling channels 7 and inside which two rotors 4 are arranged. In the example illustrated the rotors are in the example said rotors being of the mutually penetrating type having projecting lobes 5 and axes of rotation 4a arranged horizontal and parallel to the axes 6a of the semi-cylindrical walls 6. The rotors are initially horizontally displaceable by means 12.

The upper opening 2 is provided with a closing plunger 9 which can be raised so as to allow the entry of the raw materials supplied from a hopper (not shown) and which can be lowered so as to compress the material itself in the processing zone between the rotors 4.

The chamber 8 also has a lower discharge opening provided with a hatch 10 which can be rotated about a shaft 10a and kept in position by a catch 11.

According to the invention the chamber 8 has an increased volume obtained by translating symmetrically the semi-cylindrical walls 6 outwards so that the axis 6a of each wall (coinciding with the centre of the respective semi-chamber) is symmetrically translated, with respect to the axes of rotation 4a of the rotors 4, in a horizontal direction lying on a horizontal plane X—X containing the axes 4a of the rotors 4.

As can be seen more clearly from FIGS. 3a and 3b, widening of the chamber 8 results in an increased width of the chamber itself in the horizontal direction and at the same time in the height thereof being substantially maintained; this allows the rotors to be separated by the desired distance during loading, by means of symmetrical translation thereof in opposite directions until the maximum interaxial distance "D" is reached (FIG. 3a), thus favouring the rapid entry of the raw materials into the chamber and between the rotors.

As illustrated in FIG. 3b, the rotors may then be brought close to one another at a predetermined interaxial distance "d" for actual mixing of the material, the mixing being further facilitated as a result of the restricted spaces being maintained between the rotors and the upper and lower walls of the chamber.

It is therefore obvious how the mixer with the widened chamber according to the invention allows a reduction in the time for incorporation of the raw materials inside the chamber and an improvement in the homogenization of the mixture, thereby improving the overall productivity of the machine.

Many variations may be introduced as regards the realization of the parts which make up the invention, without thereby departing from the protective scope of the present patent as defined by the claims which follow.

We claim:

1. A mixer comprising:
    a housing defining an elongated mixing chamber provided with an inlet for receiving material to be mixed and an outlet for discharging mixed material;
    two rotors rotatable about mutually parallel rotor axes extending through said chamber and lying in a common horizontal plane and displaceable in said plane toward and away from one another to define a variable width of a mixing gap between circumferences of the rotors upon receiving and discharging material to be mixed in the chamber; and
    means for horizontally displacing said rotors, said chamber being formed with two subchambers each receiving a respective one of the rotors and extending along a respective chamber axis which is parallel to and lying in the horizontal plane of the rotor axes, each of said subchambers being formed with:
        a respective curved segment extending along at most a 180° arc and terminating at most in a vertical plane including the respective chamber axis, and
        a respective pair of parallel flat segments bridged by the respective curved segment and extending toward and abutting respectively the inlet and outlet of the chamber, so that tangents to imaginary extensions of the curved segments extend in vertical planes spaced apart from one another at a substantial distance.

* * * * *